United States Patent [19]

Davis et al.

[11] Patent Number: 5,263,054

[45] Date of Patent: Nov. 16, 1993

[54] METHOD AND SYSTEM FOR INTERPOLATING BAUD RATE TIMING RECOVERY FOR ASYNCHRONOUS START STOP PROTOCOL

[75] Inventors: Gordon T. Davis, Raleigh, N.C.; Baiju D. Mandalia, Boca Raton, Fla.; John C. Sinibaldi, Pompano Beach, Fla.; William M. Zevin, Boca Raton, Fla.

[73] Assignee: International Business Machines Corporation, Armonk, N.Y.

[21] Appl. No.: 886,674

[22] Filed: May 21, 1992

[51] Int. Cl.$^5$ .................. H04L 25/38; H04L 27/06
[52] U.S. Cl. ........................ 375/94; 375/95; 375/117; 307/354
[58] Field of Search .............. 375/117, 88, 94, 95; 364/723, 577; 329/300; 307/523, 352, 354, 360

[56] References Cited

U.S. PATENT DOCUMENTS

| | | | |
|---|---|---|---|
| 3,846,708 | 11/1974 | Franco | 329/104 |
| 4,270,026 | 5/1981 | Shenoi et al. | 364/723 X |
| 4,378,526 | 3/1983 | Champagne et al. | 329/104 |
| 4,412,339 | 10/1983 | Alfke et al. | 375/95 |
| 4,794,341 | 12/1988 | Barton et al. | 375/94 |
| 5,040,192 | 8/1991 | Tjahjadi | 375/80 |

*Primary Examiner*—Curtis Kuntz
*Assistant Examiner*—Tesfaldet Bocure
*Attorney, Agent, or Firm*—Duke W. Yee; Andrew J. Dillon

[57] ABSTRACT

An apparatus for efficient computation of a demodulation process on a digital signal processor for a sampled signal, which includes programming a digital signal processor to apply the sampled signal to an interpolating filter to add interpolation samples to the sampled signal, to search the sampled signal for a threshold crossing associated with a start bit, performing a linear interpolation to find a point where the threshold crossing occurs when a threshold crossing is detected, responsive to determining the point of the threshold crossing, determining a center of a start bit when the point of the threshold crossing has been determined, calculating a supplemental delay, and determining center points for subsequent of data bits utilizing the supplemental delay period from the center of the start bit.

12 Claims, 5 Drawing Sheets

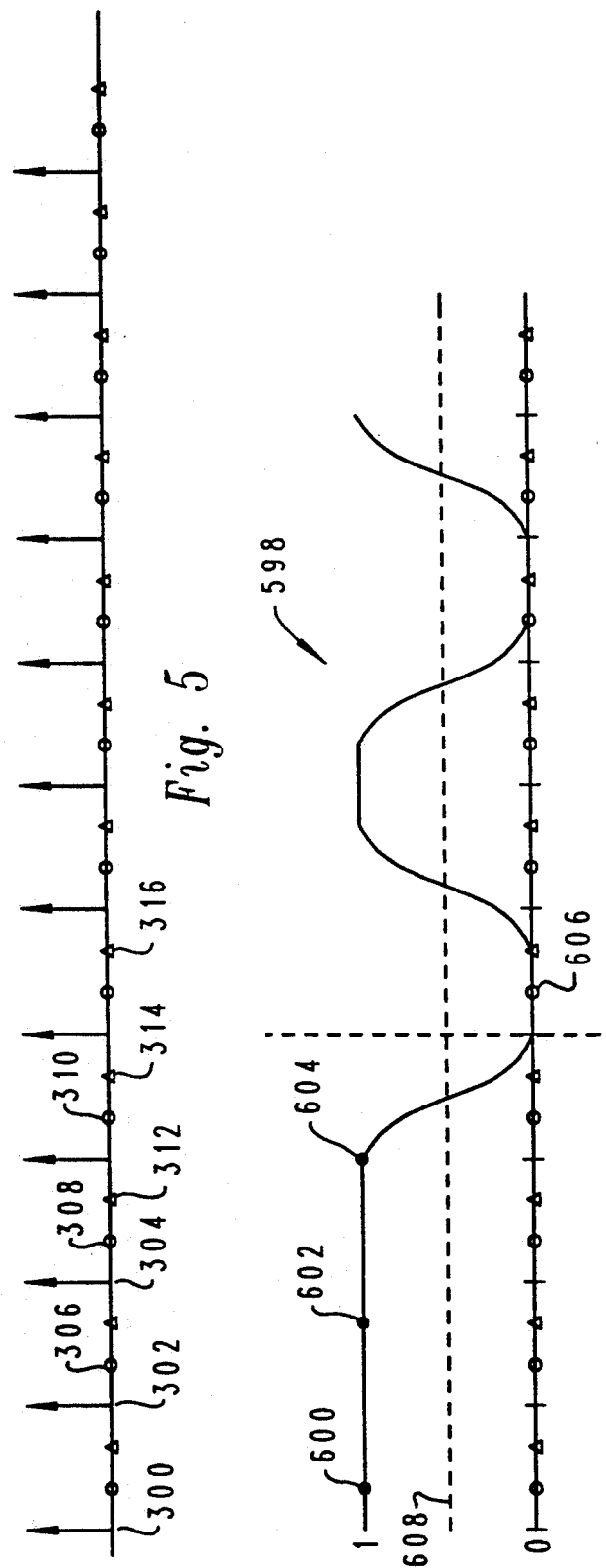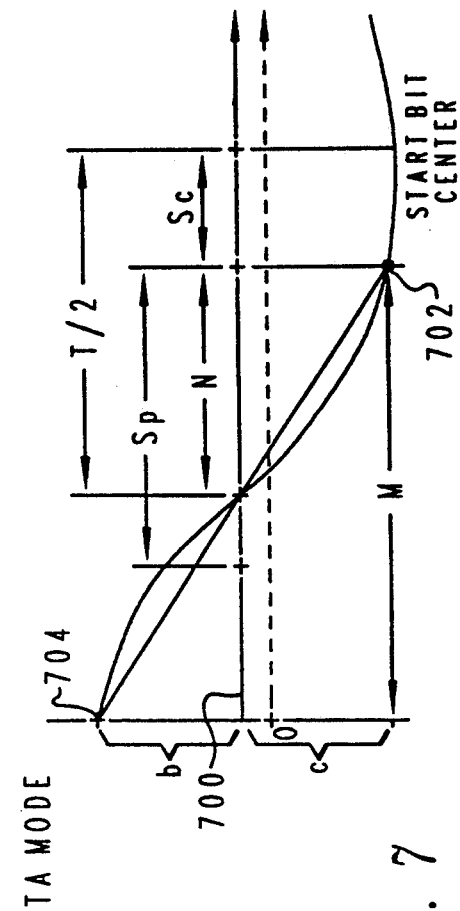

METHOD AND SYSTEM FOR INTERPOLATING BAUD RATE TIMING RECOVERY FOR ASYNCHRONOUS START STOP PROTOCOL

CROSS-REFERENCE TO RELATED APPLICATION

The present application contains subject matters related to co-pending application Ser. No. 07/886,676, entitled SYSTEM AND METHOD FOR SPLIT PHASE DEMODULATION OF FREQUENCY SHIFT KEYED SIGNALS, filed on May 21, 1992 and assigned to the assignee hereof and incorporated by reference herein.

BACKGROUND OF THE INVENTION

1. Technical Field

The present invention relates in general to a method and system for improved data communication and in particular to an improved method and system for efficient non-coherent demodulation of frequency shift keyed signals. Still more particularly, the present invention relates to an improved method and system for efficient non-coherent demodulation of frequency shift keyed signals by reducing the rate of computation required from a demodulation process on a digital signal processor.

2. Description of the Related Art

Data processing systems may transmit information, via a modem, to data processing systems at remote sites by utilizing a telephone line for transmitting frequency shift keyed ("FSK") signals. Generally in FSK, each data state is assigned a discrete frequency for transmission over a band limited channel, which prevents abrupt frequency changes between data intervals. Consequently, FSK signals show gradual changes or transitions between frequencies.

At a receiving end of a FSK transmission, the FSK signal must be demodulated in order to recreate the original signal. Non-coherent demodulation of FSK signals typically requires computation of the receiver algorithm at the sample rate which is typically eight or more times the baud rate. This frequent sampling is required because of the necessity of a post detection filter utilized to filter out frequency components at twice the carrier frequency which are generated during the demodulation process. To receive asynchronous characters utilizing a Start-Stop protocol, a universal asynchronous receiver/transmitter ("UART") typically requires an input from the demodulator which includes all of the samples in order to accurately find the center of each bit period for optimum sampling of the data stream. A bit period is the width of a pulse representing a bit of data.

Consequently, it would be desirable to have a method and system for reducing the number of computations required from a demodulator in demodulating FSK signals.

SUMMARY OF THE INVENTION

It is therefore one object of the present invention to provide a method and system for improved data communication.

It is another object of the present invention to provide an improved method and system for efficient non-coherent demodulation of frequency shift keyed signals.

It is yet another object of the present invention to provide an improved method and system for efficient non-coherent demodulation of frequency shift keyed signals by reducing the rate of computation required from a digital signal processor.

The foregoing objects are achieved as is now described. An apparatus for efficient computation of a demodulation process on a digital signal processor for a sampled signal, which includes programming a digital signal processor to apply the sampled signal to an interpolating filter to add interpolation samples to the sampled signal (increase the effective sample rate), to search the sampled signal for a threshold crossing associated with a start bit, performing a linear interpolation to find a point where the threshold crossing occurs when a threshold crossing is detected, responsive to determining the point of the threshold crossing, determining a center of a start bit when the point of the threshold crossing has been determined, calculating a supplemental delay, and determining center points for subsequent of data bits utilizing the supplemental delay period from the center of the start bit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts a graph of a series of digital samples sampled at a rate of 8 kHz per sample and at 24 kHz per sample;

FIG. 6 depicts a graph of a baseband signal 598;

FIG. 7 is a graph of various points on a baseband signal utilized while performing linear interpolation to align the start bit.

DETAILED DESCRIPTION OF PREFERRED EMBODIMENT

Figure 1:
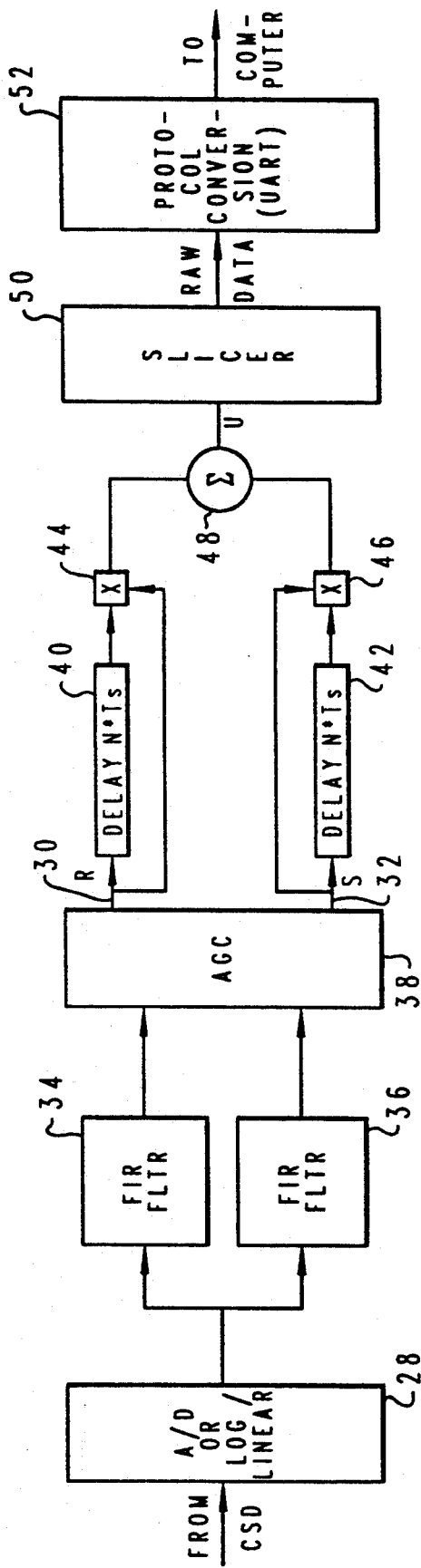
FIG. 1 is a block diagram of a circuit metaphor for detection of frequency shift keyed signals.

FIG. 1 is a block diagram illustrating the functions and relationships between functions of a frequency shift keying demodulation process suitable for execution on a digital signal processor. The block diagram may be considered as a metaphor for a frequency shift keying detection/demodulating circuit for modem 26. The first function to be executed for demodulation depends upon the nature of the received signal. The frequency shift keyed signal may be received as digitized pulse code modulated data or as an analog signal. If the signal is analog, an analog to digital converter 28 provides signal sampling and converts the signal into a 13 bit signed data. If the signal is digitized, compressed pulse code modulated data, a log/linear converter 28 is utilized to convert the signal from 8 bit format into 13 bit signed data. In this latter case, the telephone central switching office has essentially provided analog to digital conversion of the original frequency shift keyed signal. In either case, the output (hereafter the sampled signal) of analog to digital converter 28 or log/linear converter 28 is equivalent.

The sampled signal is applied along two branches or processing channels 30 and 32. Each processing channel includes a finite impulse response (FIR) filter, FIR filters 34 and 36, respectively. The output of FIR filter 34 is termed the real sampled signal, while the output of FIR filter 36 is termed the imaginary (a phase shifted) sampled signal. In each channel the FIR filter operates to filter out the energy components of the received signal outside a predetermined bandwidth. FIR filters 34 and 36 also operate as interpolating filters in that they increase the sampling rate of the sampled signal. In a preferred embodiment 8000 samples per second are received or taken. With interpolation, the apparent sampling rate is tripled to 24000 samples per second. Two additional estimated sample or interpolation points are added between each actual sample.

FIR filter 36 also acts as a Hilbert filter, shifting the phase of the sampled signal by approximately 90 degrees relative to real signal of processing channel 30.

The outputs of FIR filter 34 and FIR filter 36, the real (R) and the imaginary, phase shifted (S) signals, respectively, are applied to a automatic gain control (AGC) block 38. Automatic gain control 38 provides that the signals S and R have a constant peak amplitude, or power output.

Automatic gain control can compensate for uneven degradation between the mark and space frequencies, as can occur on a local loop. The signals S and R are then applied to tunable delay lines 40 and 42, respectively. The delay period for each line is expressed as $N*T_S$, where N is an integer and $T_S$ is the interpolation period (in the preferred embodiment, 1/24,000th of a second). The delayed signals are identified as R' and S'.

The real (R) and imaginary (S) signals are then multiplied with the outputs of delay lines 40 and 42, i.e. by R' and S' by multipliers 44 and 46. The outputs of multipliers 44 and 46 are applied to adder 48 to produce the baseband (modulating) signal U having a resolution of the interpolation period ($T_S$). Signal U is applied to a slicer 50 for recovery of raw data, which is turn is applied to a Universal Asynchronous Receiver Transmitter (UART) 52 for organization in accordance with the desired protocol (e.g. ASCII). No post detection filtering is required to remove double frequency terms. It will be apparent to those skilled in the art that other types demodulators may be constructed utilizing the method and system of the present invention.

Figure 2:
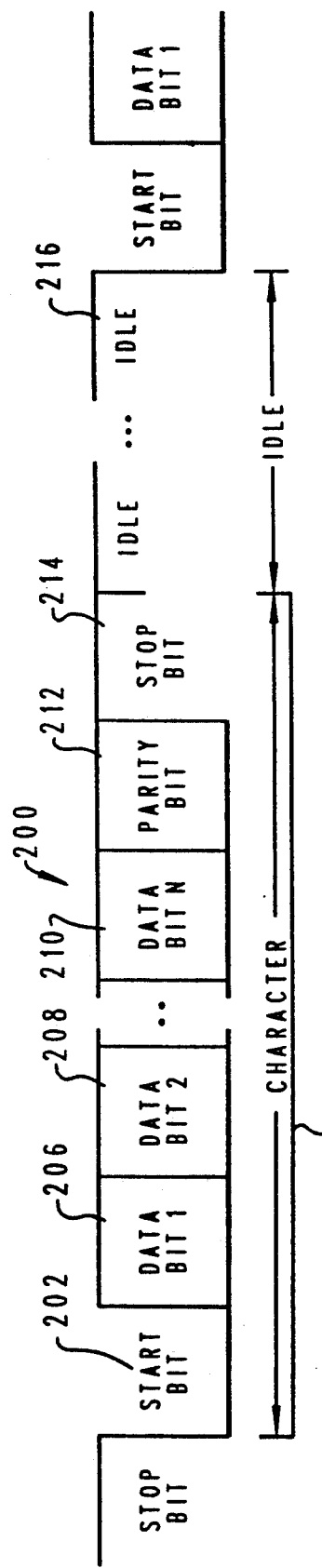
FIG. 2 is a typical start stop character stream that may be output by the FSK demodulator depicted in FIG. 1.

Referring now to FIG. 2, there is depicted a typical start-stop character bit stream that may be output by the FSK demodulator depicted in FIG. 1. Character bit stream 200 includes a number of different types of bits, including: start bits, stop bits, data bits, parity bits, and idle bits. The beginning of a start bit, such as start bit 202 must first be located before data can be received. Start bit 202 may be asynchronous from the last data bit from the demodulator and at an undetermined time delay after completion of the last character.

A character includes a group of bits that begins with a start bit, indicated by a logic 0 and ends with a stop bit, indicated by a logic 1. A character typically contains 7 or 8 bits which may include a parity bit. The time from one stop bit to the next start bit is typically filled with idle bits, and this time may be asynchronous. For example, character 204 in character bit stream 200 begins with start bit 202 followed by data bits 206, 208, and 210. Parity bit 212 follows the data bits with stop bit 214 forming the end of character 204. Idle bits, such as idle bit 216, may fill the time between a stop bit and a start bit.

Figure 3:
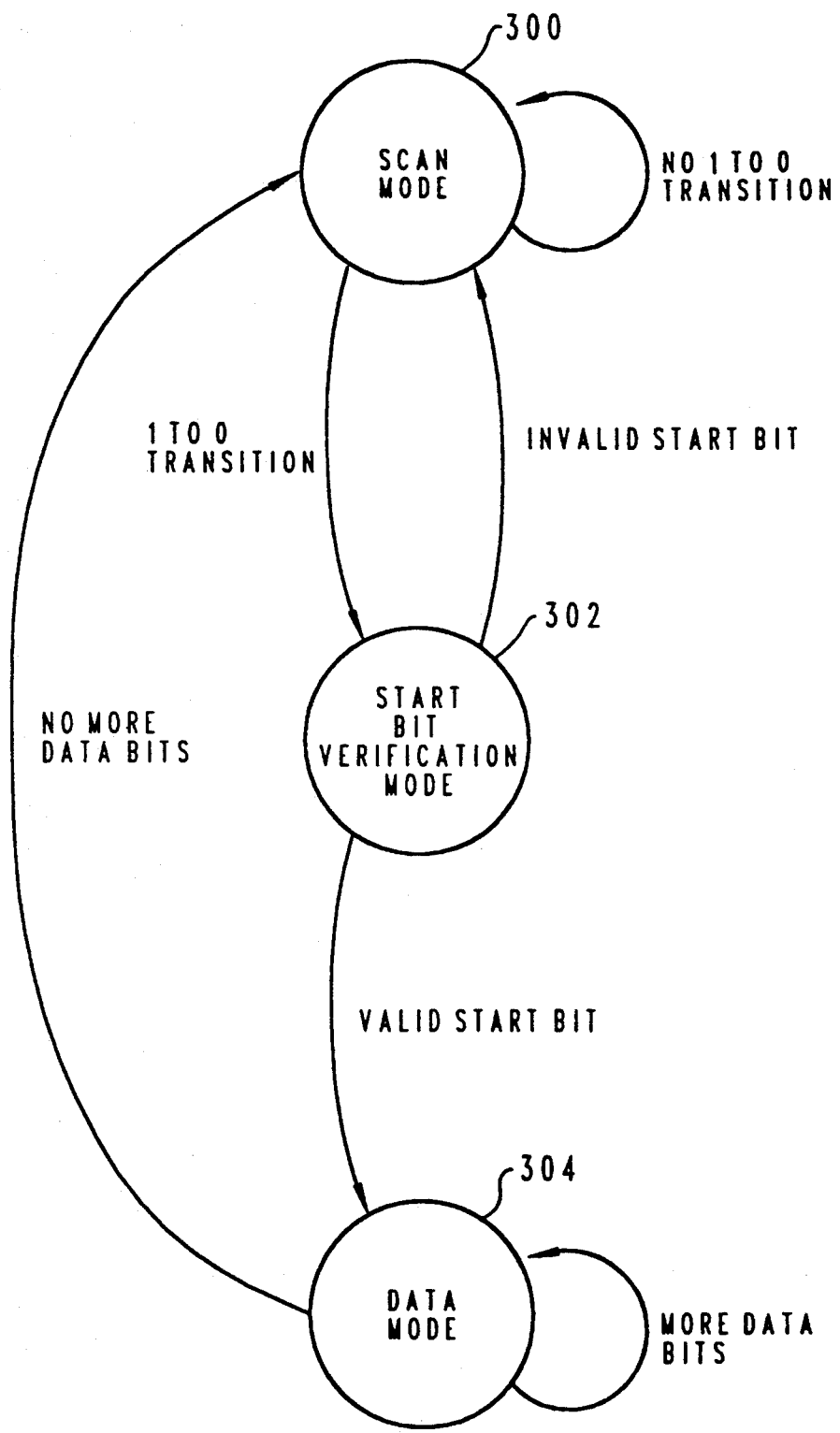
FIG. 3 depicts a state diagram for controlling a FSK demodulator in accordance with a preferred embodiment of the present invention.

Turning now to FIG. 3, there is depicted a state diagram for controlling a FSK demodulator in accordance with a preferred embodiment of the present invention. In accordance with a preferred embodiment of the present invention, this state diagram may be implemented as a state machine in a digital processing chip located in slicer 50 in FIG. 1. Those of ordinary skill in the art will realized that the state machine may be in firmware, hardware, or in software in various manners other than as implemented in the depicted embodiment.

The initial state of a state machine, as indicated by the state diagram in FIG. 3, is in scanning mode 300 in accordance with a preferred embodiment of the present invention. In this mode the state machine searches for a start bit, which is indicated by the input FSK signal falling below a predetermined threshold indicating a transition from a logic one to a logic zero. As long as no transition from a logic one to a logic zero occurs, the state machine remains in scanning mode 300.

While searching for a start bit, the nominal demodulator output should be above a switching threshold indicating logic "1" level. This searching is also called the scanning mode. A start bit is found if the output decreases to a level below the selected switching threshold.

When a logic one to logic zero transition occurs while scanning the FSK signal sent into the demodulator, the state machine moves to start bit verification mode 302. This state performs linear interpolation for start bit alignment. If the start bit turns out to be invalid, e.g., noise, the state machine returns to scan mode 300. But if the start bit is valid, start bit verification mode 302 aligns the filter to the center of the start bit utilizing linear interpolation in accordance with a preferred embodiment of the present invention. Thereafter, the state machine moves to data mode 304. Data bits received in this state are passed to a universal asynchronous receiver transmitter ("UART") for further processing. The state machine remains in data mode 304 as long as data bits are present. When a stop bit is reached, the state machine returns to scanning mode 300 to scan for another start bit. The state machine may be utilized to control the rate of filter and demodulator computations in accordance with a preferred embodiment of the present invention.

Whether a valid start bit has been found is then verified by checking that the level continues to correspond to a start bit level (logic 0). As a result, subsequent delays of one bit period should provide samples at the center of each subsequent bit period. This sampling continues until all of the bits in the current word have been detected, including the stop bits. Then, searching for another start bit begins.

When a start bit is detected, linear interpolation is utilized to determine the time delay between the demodulator computation and the actual threshold crossing. A supplemental delay period is added to the delay in order to step to the point in time corresponding to the center of the start bit.

Because the baud rate of the data stream is known, a delay of one half of a bit period is utilized to find the center of the baud period. A demodulator delay is utilized in accordance with a preferred embodiment of the present invention and is defined as the delay between the two filter calculations utilized in the demodulator. In performing data demodulation, the demodulator performs both a delayed filter calculation and a filter calculation at the current sample. Consequently two passes through the filter are required for a given demodulator delay for a given output demodulator computation.

The particular delay selected may vary and is chosen to optimize the separation between a received "1" and a received "0" in accordance with a preferred embodiment of the present invention. For example, if the delay required is one half of a bit period, the current sample on one computation may be utilized as the delayed sample for the next computation, resulting in two demodulator output samples per bit period. This rate is utilized to guarantee that any zero crossings, or in general any threshold crossings, are detected.

Normally, optimal delays are close to one half of a bit period, but rarely are exactly one half of a bit period. Under these conditions, computation of the input filter may double for each demodulator computation because each filter output may be utilized only once. As a result, in order to maintain computational efficiency, the demodulator computation is performed at the rate of the demodulator optimum delay. This rate is often out of synch with the baud rate and may be faster or slower than the baud rate depending on the optimum delay being utilized.

In accordance with a preferred embodiment of the present invention, the filter utilized is an interpolating filter. This filter may have banks of filter coefficients utilized to achieve the calculated delay to increase the sampling rate. Additional filter computation continues at twice the bit rate, and demodulator calculation continues at once per bit rate. At this time, the demodulator is in data mode. Each filter output is utilized only once in the demodulator computation at this time, but the computational load is no worse than during the start bit search in scan mode since only one computation is needed per bit period once data mode begins.

Consecutive filter outputs may not be equally spaced in time during character reception, depending on the demodulator delay utilized, and that the rate at which the demodulator outputs are calculated changes when entering data mode in order to be synchronized to the baud rate. Upon reception of a stop bit, the computations may be re-timed in accordance with the demodulator delay element unless another start bit is immediately received for processing.

The filter utilized in accordance with a preferred embodiment of the present invention provides an interpolation/decimation function, i.e., sample rate conversion function required in the current application. This requirement for sample rate conversion is present when voice-band analog modem signals are passed to the adapter card via a time-division-multiplexed ("TDM") link which requires an 8 kHz sampling rate for the corresponding analog signals. Since an 8 kHz is not evenly divisible by the baud rates required (e.g., 300, 1200, and 2400 bits per second), the sample rate must be increased by factor of 3 through a process known as interpolation or sample rate conversion. The resulting 24 kHz sampling rate may then be reduced to the required baud rates through a process known as decimation, which simply means that only those samples required to maintain the signal content are retained and the remaining samples may be discarded or left uncalculated.

Furthermore, interpolating from 8 kHz to 24 kHz has an added advantage of resulting in a better resolution in the placement of the threshold crossing for the start bit or the center of subsequent bit periods since there are three times the number of possible samples to choose from. In fact, an interpolating filter may be useful in achieving better centering within each baud period even if the system began with a more convenient sample rates such as 9600 Hz, which is evenly divisible by all required baud rates.

The actual decimation rate may vary, depending on the state of the demodulator and the UART. In the depicted embodiment, the interpolating filter is implemented utilizing 192 complex coefficients. The particular filter utilized is determined by the requirements of the specific modem and is based on a interpolated sampling rate of 24 kHz, which is three times the actual 8 kHz input sample rate supplied to the interpolating filter.

The higher sampling rate within the interpolating filter is utilized to accomplish the interpolation function. This interpolation function is accomplished by providing two zero-valued samples to the delay line for every data sample provided to the interpolating filter. It is not necessary to actually load the zero-valued samples into the delay line utilizing an interpolating filter. The same effect may be accomplished by manipulating the interpolating filter coefficients in accordance with a preferred embodiment of the present invention. The coefficients may be split into three groups or banks with only one bank being required during any specific output computation. The interpolating filter of the depicted embodiment has three banks of coefficients: bank A, includes coefficients C1, C4, C7, ... C190; bank B, includes coefficients C2, C5, C8, ... C191; and bank C, includes coefficients C3, C6, C9, ... C192. Since all coefficients in the other two banks would be multiplied by zero-valued data samples and, thus, would have no effect on the output. Those parts of the computation may be bypassed.

The sequencing of coefficient groups and the loading of new samples into the delay line may be altered when the demodulator delay is not one-half the baud period.

Figure 4:
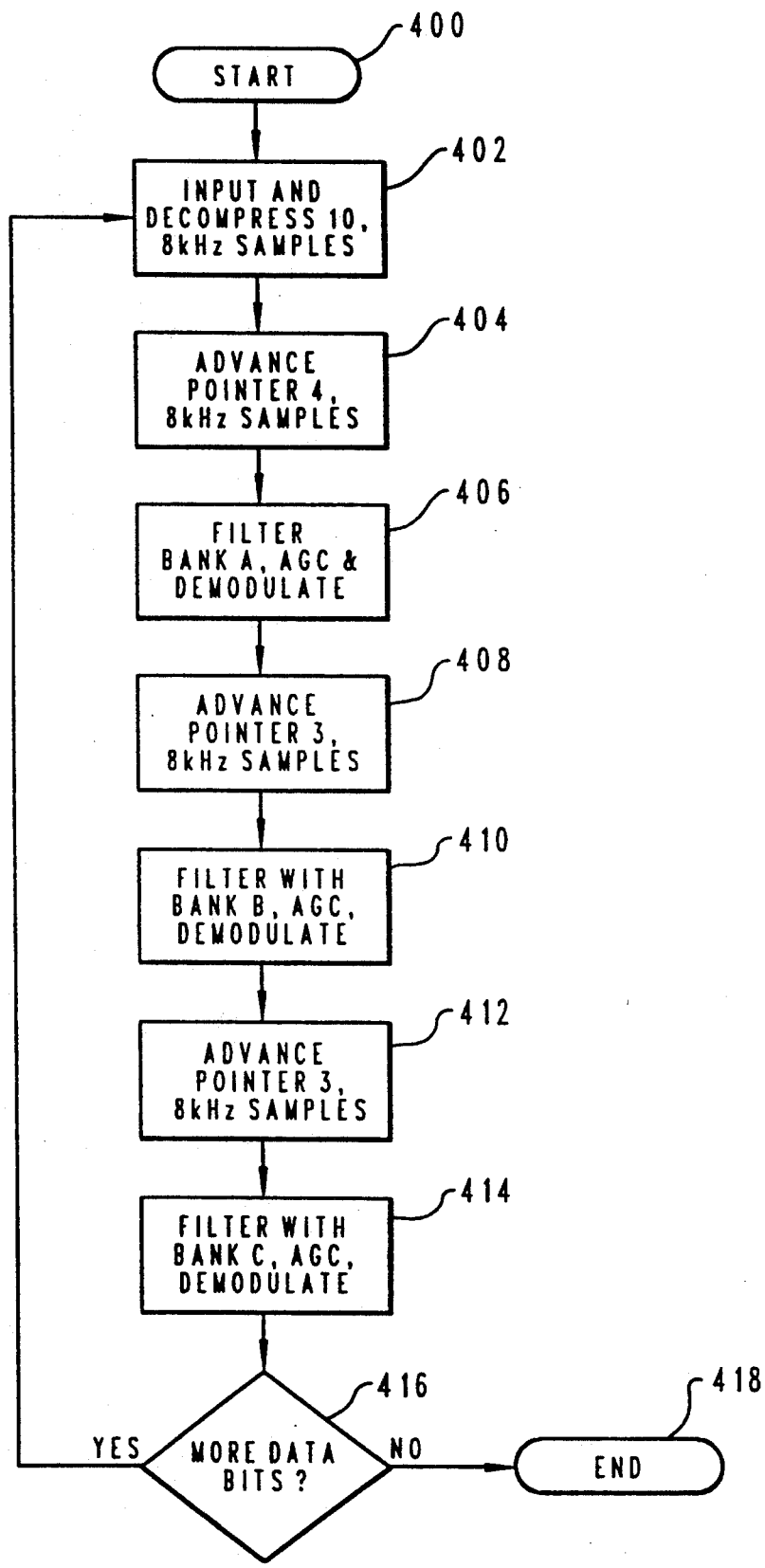
FIG. 4 is a flowchart of a process utilized for interpolating 8 kHz samples to 24 kHz samples in accordance with a preferred embodiment of the present invention.

Referring now to FIG. 4, there is depicted a flowchart of a process utilized for interpolating 8 kHz samples to 24 kHz samples in accordance with a preferred embodiment of the present invention. 8 kHz samples are loaded into a filter delay line and each of the three banks of interpolating filter coefficients are utilized to generate an output rate of 24 kHz from the interpolating filter in accordance with a preferred embodiment of the present invention. As illustrated, the process begins in block 400 and thereafter proceeds to block 402, which depicts the inputting and converting of ten logarithmic pulse code modulated 8 kHz samples to linear output (decompression).

Thereafter, the process proceeds to block 404, which illustrates advancing the filter delay line pointer forward four 8 kHz samples in the filter delay line. Next, the process proceeds to block 406, which depicts an interpolation filter computation utilizing filter bank A, performing an AGC function, then utilizing the demodulator to calculate a baseband sample. A baseband sample is a portion of the signal that has been demodulated. To find the next baseband sample, the process then proceeds to block 408, which illustrates advancing the filter delay line pointer three 8 kHz samples in the filter delay line.

Thereafter, the process proceeds to block 410, which depicts filtering the sample utilizing the coefficients in bank B in the interpolating filter, performing an AGC function, and demodulating the sample. A third baseband sample is found by advancing the filter delay line pointer forward three more 8 kHz samples in the filter delay line. Thereafter, the process proceeds to block 414, which depicts filtering the sample utilizing the coefficients in bank B of the interpolating filter, performing an AGC function on the sample, and demodulating the sample.

The process then proceeds to block 416, which illustrates a determination of whether more 8 kHz samples should be interpolated. If more samples are to be interpolated the process returns to block 402 and the entire cycle of employing filter banks A, B, and C to produce an output 24 kHz samples from the 8 kHz samples inputted into the interpolating filter. If no more 8 kHz samples are to be interpolated, the process terminates as illustrated in block 418.

This example utilized a delay of 0.5×T (T=baud period). A different delay will change number of samples that are utilized. If for example, the demodulator requires a delay of 0.45×T instead of 0.5×T, a different set of outputs from the 24 kHz sequence must be chosen.

When the state machine is in scanning mode, the spacing of filter outputs from the interpolating filter should equal the demodulator delay in accordance with a preferred embodiment of the present invention. Since 0.45×T corresponds to nine samples at 24 kHz, the required sequence is achieved by skipping eight out of every nine samples in the 24 kHz sequence. Likewise in data mode, one sample of the interpolating filter output will be calculated, then eight samples will be skipped before another sample is calculated, and then ten samples will be skipped before another calculation. This skipping is chosen to maintain synchronization with the baud rate. In this case, each of the samples is utilized only once in the demodulator computations, whereas they could be utilized twice when the filter output computations were equally spaced.

FIG. 5 depicts a graph of a series of digital samples sampled at a rate of 8 kHz per sample and at 24 kHz per sample. A sample, illustrated by up arrows, occurs every 8 kHz, e.g., point 300, point 302, and point 304. These samples filtered by bank A of the interpolating filter. These samples represent the 8 kHz samples. The interpolating filter in the depicted embodiment is employed to increase the sampling rate to 24 Khz. 24 kHz samples at the points illustrated by circles, e.g., points 306, 308, 310 are produced by filtering an 8 kHz sample with bank B of the interpolating filter. The 24 kHz samples at the points depicted by triangles, e.g. points 312, 314, 316, are produced by filtering an 8 kHz sample with coefficients in bank C of the interpolating filter. These banks of coefficients are employed to obtain the different 24 kHz points between two 8 kHz sampled from an 8 kHz sample.

Turning now to FIG. 6, a graph of a baseband signal 598 is depicted. The demodulator delay may not necessarily equal the width of the pulse. Therefore, as illustrated, the sample points may not necessarily line up with the center of the start bit. Filter bank B is utilized to demodulate point 600, and a delay of four 24 kHz samples results in point 602 being demodulated after being interpolation by bank C of the interpolating filter. Thereafter, another sample at point 604 is obtained with bank A of the interpolating filter and demodulating the interpolated sample. The sample at point 606, is produced by filtering an 8 kHz sample with bank B of the interpolating filter and then demodulating the sample.

These points represent samples from baseband signal 598. Point 606 is below switching threshold level illustrated by line 608. When this point is detected a start bit is found.

In accordance with a preferred embodiment of the present invention, the process, at this point, switches from a scanning mode to a data mode. While switching modes, the center of the start bit is found by linear interpolation, not to be confused with interpolation in the interpolating filter. The delay line pointer in the delay line is shifted so that further filtering and demodulating occurs at the center of the data bit.

When switching from scanning mode to data mode, the change must be done in such a way as to center the data reception processing on each bit period. In accordance with a preferred embodiment of the present invention, scanning mode processing detects a threshold crossing associated with a start bit by calculating a demodulator output sample at the threshold. By definition, the scanning mode requires that one or more previous demodulator samples were above the threshold. A linear interpolation algorithm is utilized to determine which of the ten points is closest to the actual threshold crossing, rather than calculate actual demodulator outputs for each one. Thus, the number of calculations may be decreased in accordance with a preferred embodiment of the present invention. As previously described, eight sample points would not be calculated in between the two calculated points defining the presences of a threshold crossing, assuming a demodulator delay of 0.45×T.

Referring now to FIG. 7, there is depicted a graph of various points on a baseband signal utilized while performing linear interpolation to align the delay line pointer to the start bit. The threshold crossing of threshold line 700 is determined by first calculating the vertical distance (amplitude), c, between the sample below the threshold at sample point 702 and at threshold line 700. This vertical distance, c, is divided by the sum of c and the previous distance or amplitude of the sample at sample point 704 above the threshold 700, b. Values for b and c are magnitudes and thus have no sign. The resulting fraction is multiplied by M, the demodulator delay, and rounded to the nearest 24 kHz sample. This value, N, indicates the number of 24 kHz sample points between the current sample at point 702 and the threshold crossing at point 700. The formula for N is $$N = \frac{|c|}{|b| + |c|} * M$$

In order to complete a new demodulator calculation, the previous filter output must be calculated according to the demodulator delay. Therefore, if N equals the number of 24 kHz samples between the threshold crossing and the calculated negative sample, and M is equal to the number of 24 kHz sample periods within the demodulator delay interval, the next filter computations required will be advanced according to the following equations:

$$Sp = T/2 - N - M$$

$$Sc = T/2 - N$$

Where Sp indicates the offset required in the sequence to calculate the previous filter output, and Sc indicates the offset, also called the supplemental delay period, needed to calculate the filter output at the start bit center, both of which are required to calculate the current demodulator output which will be centered in the start bit position. Sp may be negative, requiring backing up in the sequence of samples. Also, Sc should always be positive as long as the idle sample time is shorter than half the baud period.

If the demodulator delay equals half a baud period (M=T/2=10) the threshold crossing defines the location of the first new filter computation that is required. Whatever amounts of advancement or retardation is required may be implemented with a combination of loading new samples (or inhibiting the loading of new samples until after additional computations are made) and adjusting the active set of filter coefficients according to the basic sequence of 24 kHz samples.

Furthermore, in accordance with a preferred embodiment of the present invention, the term "threshold crossing" utilized in the above depicted embodiment means the point at which the signal crosses a given demodulator threshold, which may not be zero. In the depicted embodiment, the actual threshold is non-zero and varies in a relation dependent upon the input signal power. Consequently the threshold is dynamic.

In a preferred embodiment of the present invention, a Hilbert transform filter pair is utilized for performing input filtering. The particular filter in a preferred embodiment of the present invention contains 192 complex filter coefficients. Other versions of this filter may be also utilized, i.e., a filter version with 96 complex coefficients.

The demodulator utilized in this particular embodiment utilizes the complex filter output to cancel pass band frequencies without post-detection filtering, thus, allowing the demodulator and the filter to work only at the rate of the required demodulator output, i.e., two complex filter executions for every demodulated output value desired. Since the demodulators utilized in a preferred embodiment of the present invention require only two filter computations to define an output, many of the filter computations may be avoided.

Figure 8:
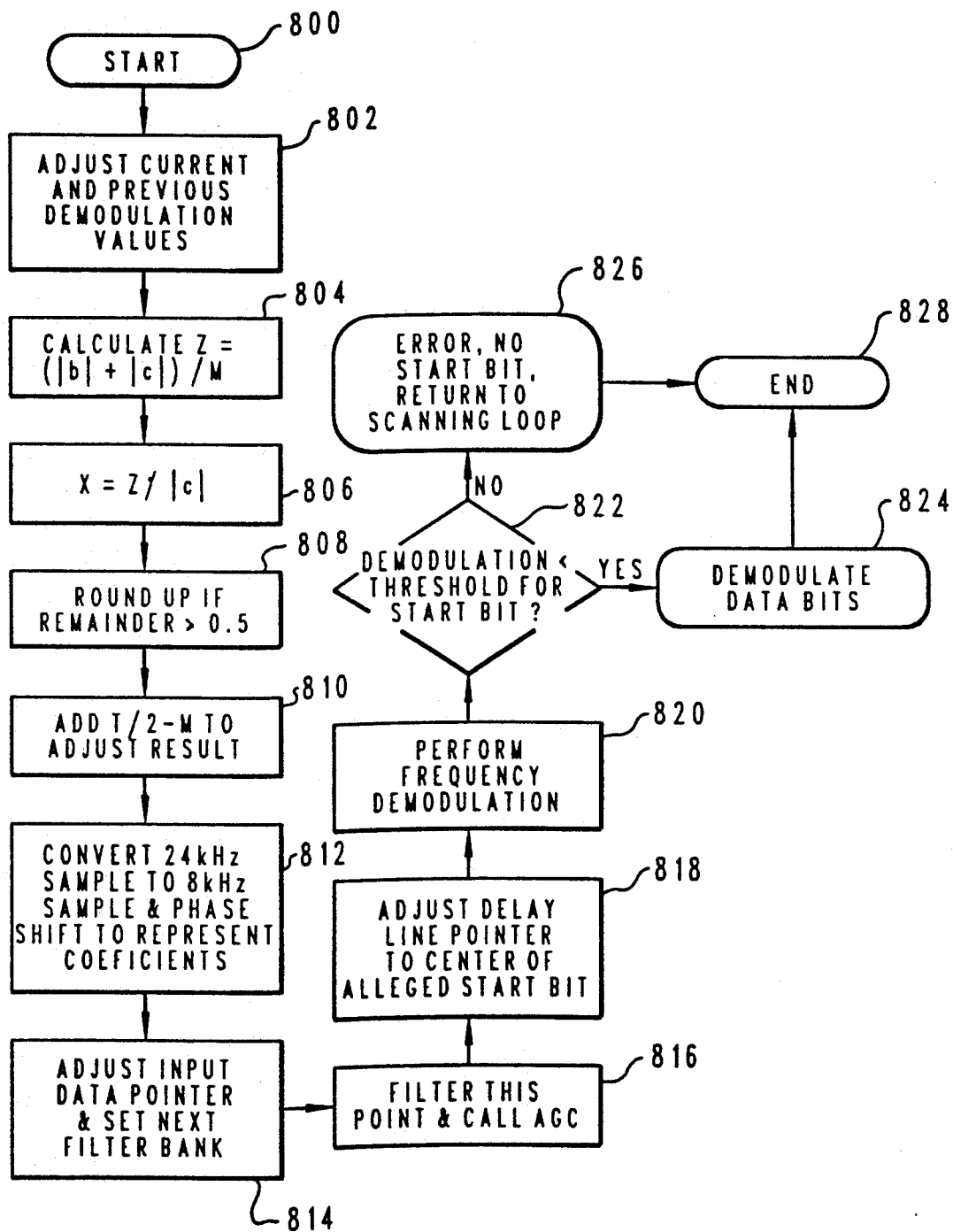
FIG. 8 depicts a flowchart illustrating a process for aligning the sampling to the center of a detected start bit.

Referring now to FIG. 8 there is depicted a flowchart illustrating a process for aligning the sampling to the center of a detected start bit in accordance with a preferred embodiment of the present invention. In a preferred embodiment of the present invention, the process may be implemented as a program running on a digital signal processor chip. As depicted, the process begins in block 800 and thereafter proceeds to block 802, which illustrates adjusting the current and previous demodulation values to account for a non-zero threshold. Thereafter, the process proceeds to block 804, which depicts determining a value Z by adding the absolute values of c and b and dividing that result by M.

Thereafter, the process proceeds to block 806, which illustrates dividing the result Z determined in block 804 by the absolute value of c. Next, the process proceeds to block 808 which depicts rounding up the result from block 806 if the remainder is greater than 0.5. The result of block 808 is the value N as depicted in FIG. 7. Next the process proceeds to block 810, which illustrates adding the value "T/2−M" to the result obtained in block 808. This value represents the point at a distance Sp from point 704 located below threshold line 700 where a filter computation is to be performed.

Thereafter the process proceeds to block 812, which depicts converting the 24 kHz sample to 8 kHz sample, using a phase shift as a numerical representation of the proper filter bank of coefficients A, B, or C. Thereafter the process proceeds to block 814, which illustrates adjusting the delay line pointer and setting the next filter bank. Thereafter, the sample is filtered and an AGC function is performed as depicted in block 816. The process then proceeds to block 818, which illustrates adjusting the delay line pointer by the value M to point to the center of the alleged start bit. Thereafter, the process proceeds to block 820, which illustrates demodulating and filtering the sample at a point at the center of the prospective start bit. Thereafter, the process proceeds to block 822, which depicts a determination of whether or not the demodulated value is below the threshold. If the demodulated value is below the threshold, a valid start bit has been found and the following data and parity bits are then received as illustrated in block 824. Thereafter, the process terminates in block 826. Otherwise, the process proceeds to block 828 which depicts returning to a scanning mode as illustrated in FIG. 4. The process then terminates in block 828.

While the invention has been particularly shown and described with reference to a preferred embodiment, it will be understood by those skilled in the art that various changes in form and detail may be made therein without departing from the spirit and scope of the invention.

What is claimed is:

1. A method for efficient computation of a demodulation process on a digital signal processor for a sampled signal, wherein the sampled signal includes a plurality of samples representing a plurality of bits, wherein each of the plurality of bits has a bit period, the method comprising:
    detecting a sampled signal;
    searching the sampled signal for an occurrence of a threshold crossing associated with a start bit;
    responsive to a detection of an occurrence of a threshold crossing, performing a linear interpolation to find a crossing point where the threshold crossing occurs;
    responsive to determining the crossing point where the threshold crossing occurs, determining a center of a start bit; and
    locating centers of subsequent bits using the center of the start bit and a bit period associated with each of the plurality of bits.

2. The method of claim 1, further comprising applying the sampled signal to an interpolating filter to add interpolation samples to the sampled signal before searching the sampled signal.

3. The method of claim 2, wherein the step of searching for an occurrence of a threshold crossing includes detecting a first sample before the occurrence of a threshold crossing and a second sample after the occurrence of a threshold crossing, wherein the first and second samples are separated by a demodulator delay.

4. The method of claim 3, wherein said of performing a linear interpolation to find a crossing point where the threshold crossing occurs includes utilizing the first and second samples to find the crossing point where the threshold crossing occurs.

5. The method of claim 2 further comprising testing samples representing a bit to determine whether the bit is valid.

6. The method of claim 1, wherein the step of determining a center of a start bit includes using the crossing point and one half of the bit period to determine the center of the start bit.

7. An apparatus for efficient computation for efficient computation of a demodulation process on a digital signal processor for a sampled signal, wherein the sampled signal includes a plurality of samples representing has a plurality of bits, wherein each of the plurality of bits has a bit period, the apparatus comprising:

detection means for detecting a sampled signal;

means for searching the sampled signal for an occurrence of a threshold crossing associated with a start bit;

means, responsive to a detection of an occurrence of a threshold crossing, for performing a linear interpolation to find a crossing point where the threshold crossing occurs;

means, responsive to determining the crossing point where the threshold crossing occurs, for determining a center of a start bit; and location means for locating centers of subsequent bits using the center of the start bit and a bit period associated with each of the plurality of bits.

8. The apparatus of claim 7, further comprising means for applying the sampled signal to an interpolating filter to add interpolation samples to the sampled signal before searching the sampled signal.

9. The apparatus of claim 8, wherein the means for searching for an occurrence of a threshold crossing includes detection means for detecting a first sample before the occurrence of a threshold crossing and a second sample after the occurrence of a threshold crossing, wherein the first and second samples are separated by a demodulator delay.

10. The apparatus of claim 9, wherein said means for performing a linear interpolation to find a crossing point where the threshold crossing occurs includes means for utilizing the first and second samples to find the crossing point where the threshold crossing occurs.

11. The apparatus of claim 10 further comprising testing means for testing samples representing a bit to determine whether the bit is valid.

12. The apparatus of claim 7, wherein the means for determining a center of a start bit includes using the crossing point and one half of the bit period to determine the center of the start bit.

* * * * *